United States Patent
Boerger et al.

(10) Patent No.: US 6,760,124 B1
(45) Date of Patent: Jul. 6, 2004

(54) SOFTWARE DETERMINATION OF LED BRIGHTNESS AND EXPOSURE

(75) Inventors: Paul A. Boerger, Loveland, CO (US); Keith Forrest, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/532,696

(22) Filed: Mar. 22, 2000

(51) Int. Cl.$^7$ ................................................ H04N 1/04
(52) U.S. Cl. ...................... 358/1.9; 358/471; 358/474; 358/475
(58) Field of Search .................... 358/1.9, 471, 474, 358/475, 482, 406, 504; 346/236, 238

(56) References Cited

U.S. PATENT DOCUMENTS

| | | | | |
|---|---|---|---|---|
| 5,016,027 A | * | 5/1991 | Uebbing | 347/236 |
| 5,065,007 A | | 11/1991 | Tanaka | |
| 5,471,052 A | | 11/1995 | Ryczek | |
| 5,532,848 A | * | 7/1996 | Beretta | 358/504 |
| 5,596,387 A | * | 1/1997 | Takagi | 396/50 |
| 5,678,098 A | * | 10/1997 | Ishihara et al. | 396/233 |
| 5,774,747 A | * | 6/1998 | Ishihara et al. | 396/61 |
| 5,803,579 A | | 9/1998 | Turnbull et al. | |
| 5,894,341 A | * | 4/1999 | Nishi et al. | 355/68 |
| 6,015,200 A | * | 1/2000 | Ogura | 347/3 |
| 6,078,732 A | * | 6/2000 | Beretta | 358/1.9 |
| 6,087,846 A | | 7/2000 | Alvord et al. | |
| 6,127,783 A | | 10/2000 | Pashley et al. | |
| 6,130,700 A | * | 10/2000 | Murayama et al. | 347/240 |
| 6,180,415 B1 | | 1/2001 | Schultz et al. | |
| 6,342,945 B1 | | 1/2002 | Allen et al. | |
| 6,389,232 B2 | * | 5/2002 | Ishihara et al. | 396/161 |
| 6,486,945 B1 | | 11/2002 | Haerle et al. | |
| 6,496,651 B2 | * | 12/2002 | Ishihara et al. | 396/231 |

FOREIGN PATENT DOCUMENTS

WO    WO 01/27910    4/2001

\* cited by examiner

Primary Examiner—Thomas D. Lee
(74) Attorney, Agent, or Firm—Alexander J. Neudeck

(57) ABSTRACT

The junction temperature of an LED is determined. This result is used to determine an initial brightness value of the LED. The initial brightness value is derated by a long-term degradation amount that is determined using a stored indication of the lifetime total on time. The derated brightness value is used to determine an exposure for a capture system. The junction temperature is determined by measuring the ambient temperature and then keeping a running junction temperature determined from the on and off times.

22 Claims, 2 Drawing Sheets

US 6,760,124 B1

SOFTWARE DETERMINATION OF LED BRIGHTNESS AND EXPOSURE

CROSS REFERENCE TO RELATED APPLICATIONS

A related copending United States patent applications commonly owned by the assignee of the present document and incorporated by reference in its entirety into this document is being filed in the United States Patent and Trademark Office on or about the same day as the present application. This related application is Hewlett-Packard, Ser. No. 09/532,398 and is titled "HARDWARE MODELING OF LED RELATIVE BRIGHTNESS."

FIELD OF THE INVENTION

The invention relates generally to precision control of an exposure and more particularly to modeling the light output of a light emitting diode (LED) to maintain a constant exposure as the light output of an array of LED's changes over temperature and the lifetime of the part.

BACKGROUND OF THE INVENTION

High quality image capture such, as grayscale and color imaging, needs a precision light source. Because of their size, price, reliability, and other qualities, light emitting diodes (LED's) may be chosen as the light source for image capture. Unfortunately, the light output of an LED changes with junction temperature and age. Because LED's heat up when they are on, one of the factors that determines the junction temperature of an LED, and hence its light output, is the amount of time, and duty cycle, that the LED is on. One way to compensate for at least part of this variation is to use a light calibration strip. A light calibration strip may be used with a search algorithm to set the illumination levels prior to image capture. A disadvantage of this method is that part of the image capture array is used to sense the calibration strip. This decreases the width or area that is captured at any given moment. Another disadvantage is that this method does not account for changes in the junction temperature during image capture.

Accordingly, there is a need in the art for an illumination compensation. method and apparatus that does not utilize a light calibration strip.

SUMMARY OF THE INVENTION

An embodiment of the calculates the LED light output given a set of calibration values, the ambient temperature, the recent on-off history of the device, and the long term history of the device. Once the LED light output is calculated, an exposure can be calculated that will be nearly constant over the operating conditions and lifetime of the device. The ambient temperature is obtained from a temperature sensor. The recent on-off history of the device is timed with a counter-timer. The long-term history of the device and the calibration values are recorded in non-volatile memory. The calibration values are measured and set at the time of manufacture and ensure that each device produces nearly the same exposure under the same conditions.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
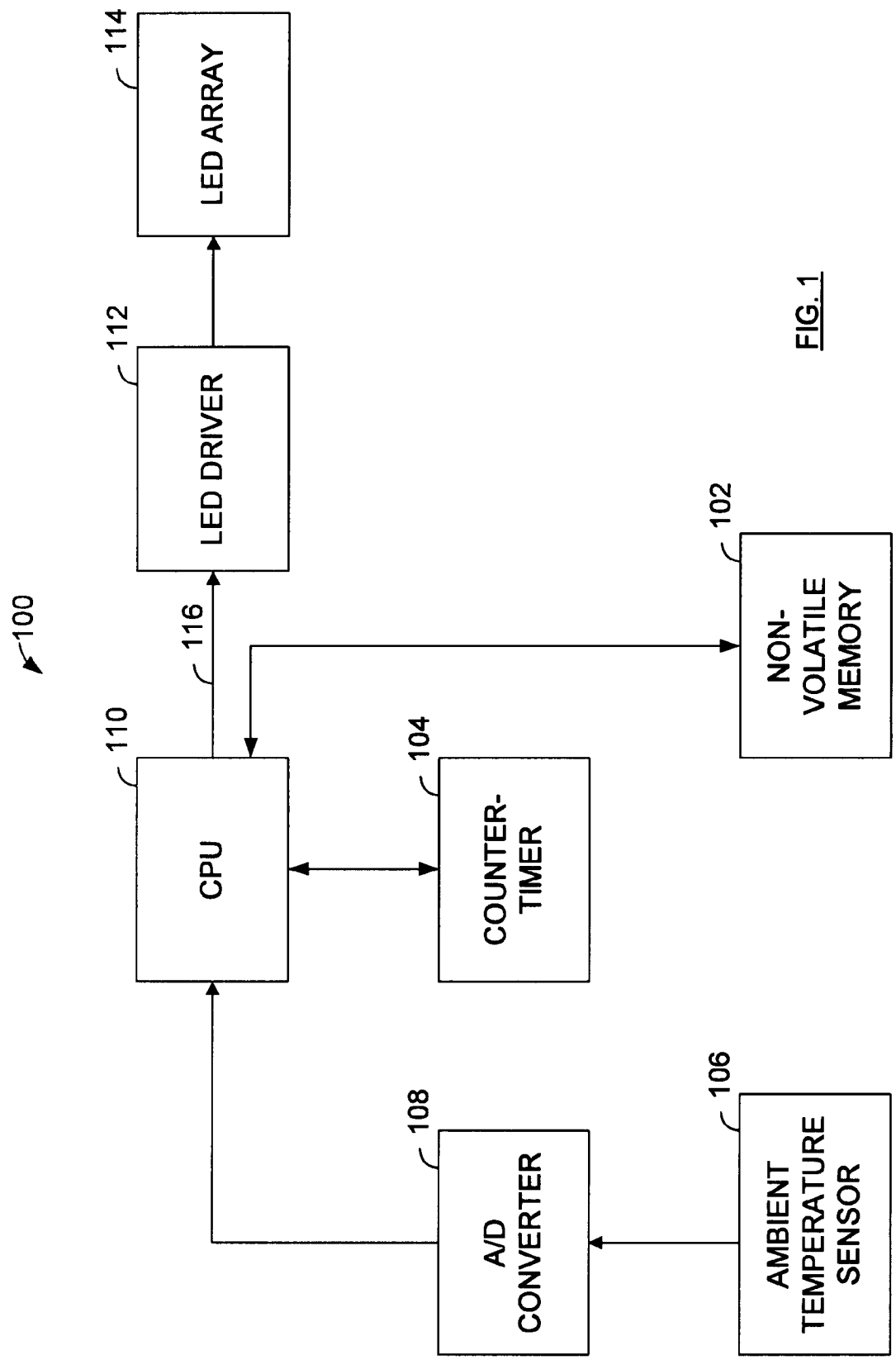
FIG. 1 is a block diagram of a capture exposure system.

FIG. 1 is a block diagram of a capture exposure system 100. Central processing unit (CPU) 110 sends illumination control signal 116 to LED driver 112 and LED model 102. LED driver 112 is coupled to LED array 114. LED array 114 provides illumination for capturing an image. This capture exposure system also has an ambient temperature sensor 106. The output of ambient temperature sensor 106 is read by A/D converter 104 and passed to CPU 110. Non-volatile memory 102 is coupled to CPU 110 and stores calibration values and long term history information. Counter-timer 104 is also coupled to CPU 110 and times the LED on times and the LED off times.

The light output of an LED can be described with the following equation using an experimentally derived figure-of-merit $T_0$:

$$LOP(T_j) = K_L e^{\left[\frac{-(T_j - T_c)}{T_0}\right]} \qquad \text{Equation 1}$$

where LOP(T) is the light output when the p-n junction of the LED is at temperature $T_j$ and $K_L$ is a measured constant that corresponds to the light output when the p-n junction of the LED is at $T_c$. $T_0$ is determined by measuring the relative light output at numerous junction temperatures and then applying an exponential fit to determine the $T_0$ for that particular device. The above equation describes light output in terms of the p-n junction temperature. Unfortunately, this temperature depends on number of other factors including the ambient temperature, the short and long-term on-off histories of the LED, the forward voltage, forward current, LED efficiency, and the thermal time constant of the LED. The short term on-off history of the LED is particularly important because it determines the starting temperature of the LED each time it is turned on or turned off. The long-term history of the LED is not as large a factor, but still may affect the brightness of the LED by as much as 3% over several years. When an LED is on, the junction temperature follows a heating curve that resembles:

$$T_j = (T_\infty - T_{on})\left[1 - e^{\frac{-t}{\tau}}\right] + T_{on} \qquad \text{Equation 2}$$

where $T_{on}$ is the starting temperature of the junction when the LED is turned on, $T_\infty$ is the steady-state junction temperature that the junction would reach after the LED is on a long time and $\tau$ is the thermal time constant of the LED. When an LED is off, the junction temperature follows a cooling curve that resembles:

$$T_j = (T_{off} - T_a)e^{\frac{-t}{\tau}} + T_a \qquad \text{Equation 3}$$

where $T_{off}$ is the starting temperature of the junction when the LED is turned off, $T_a$ is the ambient air temperature and $\tau$ is the thermal time constant of the LED.

Over the long-term lifetime of an LED, its brightness diminishes slightly. The percent of light output after time t when compared to original light output can be expressed as:

$$\% \ LOP(t) = \frac{K_D t}{100} \%  \qquad \text{Equation 4}$$

where $K_D$ is a constant that is on the order of $10^{-3}$ when t is in hours of on time. $K_D$ may be different for each LED, however, value can be chosen through experimentation or other means that can be used to produce an adequate approximation of the long-term brightness degradation for a particular type, make, or model of LED.

Figure 2:
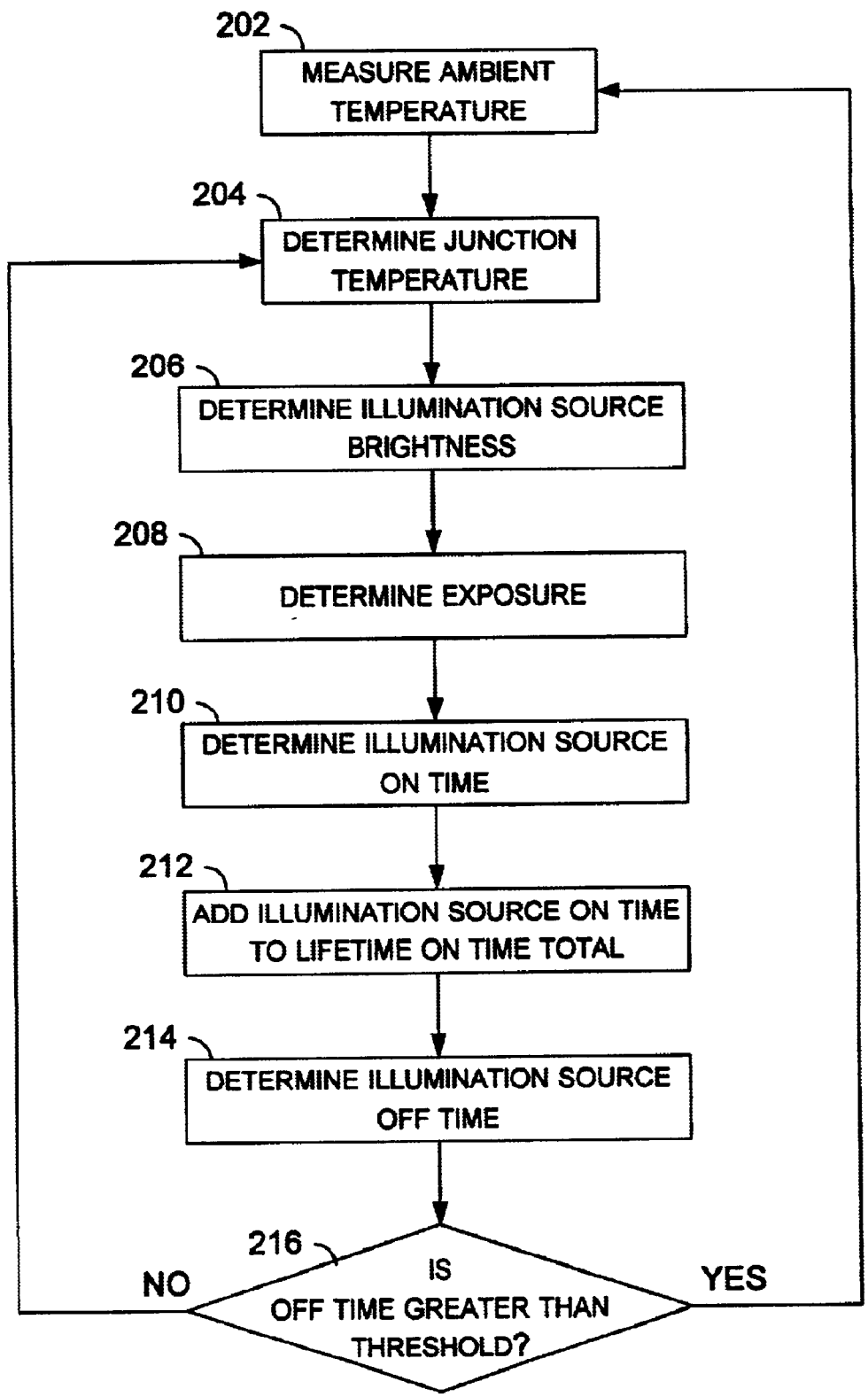
FIG. 2 is a flowchart illustrating steps used to calculate illumination and exposure.

FIG. 2 is a flowchart illustrating steps used to calculate illumination and exposure. In a step 202, the ambient temperature is measured. If these steps are performed on the system of FIG. 1, this would be done by ambient temperature sensor 106 and A/D converter 108 under the control of, and the results passed to, CPU 110. In a step 204, the junction temperature is determined. In the preferred embodiment, this is done using Equation 3, Equation 4, a previous junction temperature value, and the on and off times of the illumination source since the last time the junction temperature was determined. If the illumination source has been off for a long time relative to the thermal time constant of the illumination source, then the junction temperature is the ambient temperature and these equations need not be used. This assumption agrees with the result produced by Equation 3 with t>>τ. In a step 206, the light output is determined from the junction temperature and the long-term history. In the preferred embodiment, this is done using Equation 1 which is then derated by a percentage determined using Equation 4. In a step 208, an exposure is determined using the light output determined in step 206. This exposure can be determined a number of ways including dividing the light output by a constant to determine an exposure time or stepwise integrating Equation 1 over time with Equation 2 determine instantaneous junction temperatures until a desired exposure is reached.

In a step 210, the time that the illumination source has been on is determined. If these steps are performed on the system of FIG. 1, this would be done with information received from counter-timer 104. In the alternative, since the CPU controls the on and off times of the illumination source, the CPU could calculate the on time of the illumination source. In a step 212, the illumination source on time is added to a lifetime on time total. This lifetime on time total is used in Equation 4. In a step 214, the off time of the illumination source is determined. In a system that controls exposure by means other than turning the illumination source on and off, this time may be zero in which case this step may be unnecessary. In a decision box 216, the off time is tested against a threshold value. In a preferred embodiment, this threshold value is much greater than the thermal time constant of the illumination source. If the off time is greater than this threshold value then the process loops back to step 202 and the ambient temperature is measured again. If the off time is not greater than this threshold, then the process loops back to step 204 to calculate the junction temperature again.

In the preferred embodiment, the capture exposure is adjusted by turning the LED array on for the capture exposure time. However, other methods of adjusting the capture exposure, such as opening and closing a shutter, may be used. The system and method of the invention can be easily adapted to these other systems by, for example, using an off time of zero during exposure and skipping step 214 until the LED array is turned off between captures.

From the foregoing it will be appreciated that the capture exposure system and LED relative brightness model provided by the invention offers the advantages of simplicity and avoids the calculation of difficult exponential equations or continuos integration by the control microprocessor. Furthermore, the system may be configured to a variety of thermal parameters or adapted to a variety of exposure control mechanisms.

Although several specific embodiments of the invention have been described and illustrated, the invention is not to be limited to the specific forms or arrangements of parts so described and illustrated. The invention is limited only by the claims.

What is claimed is:

1. An image capture device, comprising:
   an illumination source;
   a thermal model of said illumination source that determines a temperature of said illumination source, wherein said thermal model has a model input and said model input is an indication of the on times and the off times of said illumination source;
   a light output model of said illumination source that determines a light output of said illumination source from said temperature; and,
   an exposure adjustment that is changed to compensate for changes in said illumination sources indicated by said model output.

2. The image capture device of claim 1, further comprising:
   an ambient temperature sensor producing a sensed ambient temperature wherein said temperature is affected by said sensed ambient temperature.

3. The image capture device of claim 2 wherein said illumination source is at least one light emitting diode.

4. The image capture device of claim 3 wherein said thermal model of said illumination source comprises software executing on a computer.

5. The image capture device of claim 3 wherein said illumination model of said illumination source comprises software executing on a computer.

6. The image capture device of claim 3 wherein said exposure adjustment changes said on times of said illumination source.

7. A method of compensating for changes in an illumination source, comprising:
   determining a temperature of said illumination source using an indication of the on times and the off times of said illumination source;
   determining a light output of said illumination source from said temperature; and,
   adjusting an exposure to compensate for changes in said illumination source as indicated by said light output.

8. The method of claim 7 further comprising:
   sensing an ambient temperature.

9. The method of claim 8 wherein said illumination source is at least one light emitting diode.

10. The method of claim 9 wherein said step of determining a light output includes derating said light output by an amount determined in part by a long-term total on time of said illumination source.

11. An article of manufacture comprising a program storage medium having computer readable program code means embodied therein for causing the adjustment of an exposure, the computer readable program code means in said article of manufacture comprising:
   computer readable program code means for causing a computer to determine an indication of a temperature of an illumination source;

computer readable program code means for causing a computer to determine an indication of brightness of said illumination source from said indication of said temperature;

computer readable program code means for causing said computer to adjust said exposure based on said indication of said illumination sources brightness; and, computer readable program code means for causing said computer to turn on and turn off said illumination source.

12. The article of manufacture of claim 11 further comprising:

computer readable program code means for causing said computer to determine the on times and off times of said illumination source.

13. The article of manufacture of claim 12 further comprising:

computer readable program code means for causing said computer to obtain an indication of an ambient temperature; and, computer readable program code means for causing said computer to adjust said temperature based on said indication of said ambient temperature.

14. The article of manufacture of claim 13 wherein said illumination source is at least one light emitting diode.

15. The article of manufacture of claim 14 further comprising:

computer readable program code means for causing said computer to obtain an indication of a lifetime on time of said illumination source; and, computer readable program code means for causing said computer to adjust said indication of brightness of said illumination source based on said indication of said lifetime on time.

16. The article of manufacture of claim 15 wherein said indication of said lifetime on time is stored in a non-volatile storage device.

17. An image capture device, comprising:

illumination means;

thermal modeling means, said thermal modeling means producing a thermal modeling means output that is indicative of said illumination means temperature, wherein said thermal modeling means has a thermal modeling means input and said thermal modeling means input is an indication of the on times and the off times of said illumination means;

brightness modeling means, said brightness modeling means producing a brightness modeling means output that is indicative of said illumination means brightness; and, exposure adjustment means for changing and exposure to compensate for changes in said brightness of said illumination means as indicated by said brightness modeling means output.

18. The image capture device of claim 17, further comprising:

ambient temperature sensor means for producing a sensed ambient temperature wherein said thermal modeling means output is changed to compensate for said sensed ambient temperature.

19. The image capture device of claim 18 wherein said illumination means is at least one light emitting diode.

20. The image capture device of claim 19 wherein said brightness modeling means output is affected by an indication of a lifetime on time of said illumination means.

21. The image capture device of claim 20 wherein said indication of said lifetime on time of said illumination means is stored in a non-volatile memory means.

22. The image capture device of claim 21 wherein said exposure is adjusted by changing said on times of said illumination source.

* * * * *